(12) United States Patent
Wigren

(10) Patent No.: US 11,743,835 B2
(45) Date of Patent: Aug. 29, 2023

(54) TRANSMISSION POWER CONTROL OF A RADIO BASE STATION

(71) Applicant: Telefonaktiebolaget LM Ericsson (publ), Stockholm (SE)

(72) Inventor: Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 154 days.

(21) Appl. No.: 17/438,144

(22) PCT Filed: Mar. 28, 2019

(86) PCT No.: PCT/SE2019/050282
§ 371 (c)(1),
(2) Date: Sep. 10, 2021

(87) PCT Pub. No.: WO2020/197455
PCT Pub. Date: Oct. 1, 2020

(65) Prior Publication Data
US 2022/0191803 A1    Jun. 16, 2022

(51) Int. Cl.
*H04W 52/18* (2009.01)
*H04W 52/22* (2009.01)
*H04W 52/14* (2009.01)

(52) U.S. Cl.
CPC ....... *H04W 52/225* (2013.01); *H04W 52/143* (2013.01)

(58) Field of Classification Search
CPC .. H04W 52/225; H04W 52/143; H04W 52/18
See application file for complete search history.

(56) References Cited

U.S. PATENT DOCUMENTS

| 8,538,351 B2 * | 9/2013 | Wilson | H04B 1/04 455/127.1 |
| 11,362,725 B2 * | 6/2022 | Vieira | H04B 7/0857 |
| 11,412,523 B2 * | 8/2022 | Wigren | H04W 72/12 |

(Continued)

FOREIGN PATENT DOCUMENTS

| WO |  | 2018056876 A1 | 3/2018 |  |
| WO |  | WO-2018056876 A1 * | 3/2018 | ............. H01Q 1/245 |

*Primary Examiner* — Hai V Nguyen
(74) *Attorney, Agent, or Firm* — Murphy, Bilak & Homiller, PLLC

(57) ABSTRACT

There is provided mechanisms for controlling total average transmission power of a radio base station. A method is performed by a control device. The method comprises performing control of total average transmission power $(P_{tot})(t)$ of the radio base station according to a back-off power control loop. In the back-off power control loop, a setpoint value $(Ptot)^{ref}$ of the total average transmission power is compared with a value of the total average transmission power $(P_{tot})(t)$—The value of the total average transmission power $(P_{tot})(t)$ is computed over an averaging time T. Control parameters of the back-off power control loop are scaled proportionally to the inverse of the averaging time T. The control parameters pertain to a response time of the back-off power control loop.

20 Claims, 11 Drawing Sheets

(56) References Cited

U.S. PATENT DOCUMENTS

| | | | |
|---|---|---|---|
| 2012/0021800 A1* | 1/2012 | Wilson | H04W 72/02 455/127.1 |
| 2022/0240200 A1* | 7/2022 | Wigren | H04W 52/143 |
| 2022/0264473 A1* | 8/2022 | Wigren | H04W 52/146 |
| 2022/0338134 A1* | 10/2022 | Wigren | H04W 52/42 |

* cited by examiner

TRANSMISSION POWER CONTROL OF A RADIO BASE STATION

TECHNICAL FIELD

Embodiments presented herein relate to a method, a control device, a computer program, and a computer program product for controlling total average transmission power of a radio base station.

BACKGROUND

When any radio equipment is to be deployed, regulatory radio frequency (RF) electromagnetic field (EMF) exposure requirements should be accounted for. These RF EMF exposure regulations may typically be based on international guidelines and standards from for example the International Commission on Non-Ionizing Radiation Protection (IC-NIRP) but may take different forms in some countries and regions. An aim of the RF EMF exposure regulations is to secure that the human exposure to RF energy is kept within prescribed limits, which typically have been set with wide safety margins.

Some newly developed base stations and other radio equipment are equipped with so-called advanced, or active, antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of transmitters in order to achieve a high directivity, when emissions are correlated between the transmitters then there could be a large beamforming gain. A consequence of increasing beamforming gain is that the radiated energy is concentrated in directional beams, in which the Equivalent Isotropic Radiated Power (EIRP), i.e. the power radiated from an antenna with unity antenna gain in all directions, is increased as compared to the situation without AAS systems.

The RF EMF exposure limits are typically expressed in terms of power density (in units of $W/m^2$) which in the far field is proportional to the EIRP. Consequently, the EIRP can be used to determine the power density in the far field. This implies that the experienced momentary EIRP, and the resulting power density at a given distance from the antenna, will be higher in a beam generated by an AAS system with beam forming gain, than without such an AAS system.

The ICNIRP and other RF EMF exposure limitations are commonly expressed as an average power density over a specified time interval T. This means that the momentary power density can be significantly higher during a shorter time than T, however the time-averaged power density over any time period T must be below the specified limit. To maintain a certain RF EMF exposure compliance distance (or boundary), that is shorter (or smaller) than what is obtained using the maximum EIRP of the AAS, the time-averaged power needs to be maintained at or below a pre-determined threshold or a set of pre-defines thresholds for different beam directions.

Hence, there may be a need for efficient control of the average transmitted power for base stations and other radio equipment.

SUMMARY

An object of embodiments herein is to provide efficient control of the average transmitted power for base stations and other radio equipment.

This objective is generally solved by mechanisms performed by a control device for controlling total average transmission power of a radio base station.

According to a first aspect there is presented a method for controlling total average transmission power of a radio base station. The method is performed by a control device. The method comprises performing control of total average transmission power $\langle P_{tot} \rangle$ (t) of the radio base station according to a back-off power control loop. In the back-off power control loop, a setpoint value $\langle P_{tot} \rangle^{ref}$ of the total average transmission power is compared with a value of the total average transmission power $\langle P_{tot} \rangle$ (t). The value of the total average transmission power $\langle P_{tot} \rangle$ (t) is computed over an averaging time T. Control parameters of the back-off power control loop are scaled proportionally to the inverse of the averaging time T. The control parameters pertain to a response time of the back-off power control loop.

According to a second aspect there is presented a control device for controlling total average transmission power of a radio base station. The control device comprises processing circuitry. The processing circuitry is configured to cause the control device to perform control of total average transmission power $\langle P_{tot} \rangle$ (t) of the radio base station according to a back-off power control loop. In the back-off power control loop, a setpoint value $\langle P_{tot} \rangle^{ref}$ of the total average transmission power is compared with a value of the total average transmission power $\langle P_{tot} \rangle$ (t). The value of the total average transmission power $\langle P_{tot} \rangle$ (t) is computed over an averaging time T. Control parameters of the back-off power control loop are scaled proportionally to the inverse of the averaging time T. The control parameters pertain to a response time of the back-off power control loop.

According to a third aspect there is presented a control device for controlling total average transmission power of a radio base station. The control device comprises a control module configured to perform control of total average transmission power $\langle P_{tot} \rangle$ (t) of the radio base station according to a back-off power control loop. In the back-off power control loop, a setpoint value $\langle P_{tot} \rangle^{ref}$ of the total average transmission power is compared with a value of the total average transmission power $\langle P_{tot} \rangle$ (t). The value of the total average transmission power $\langle P_{tot} \rangle$ (t) is computed over an averaging time T. Control parameters of the back-off power control loop are scaled proportionally to the inverse of the averaging time T. The control parameters pertain to a response time of the back-off power control loop.

According to a fourth aspect there is presented a computer program for controlling total average transmission power of a radio base station, the computer program comprising computer program code which, when run on a control device, causes the control device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this method, these control devices, this computer program and this computer program product enable efficient control of the average transmitted power of the base station.

Advantageously this method, these control devices, this computer program and this computer program product reduces capacity losses of the back-off power controller.

Advantageously this method, these control devices, this computer program and this computer program product improves stability of the back-off power controller.

Advantageously this method, these control devices, this computer program and this computer program product enable uniform behavior of the back-off power control loop for different averaging times.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
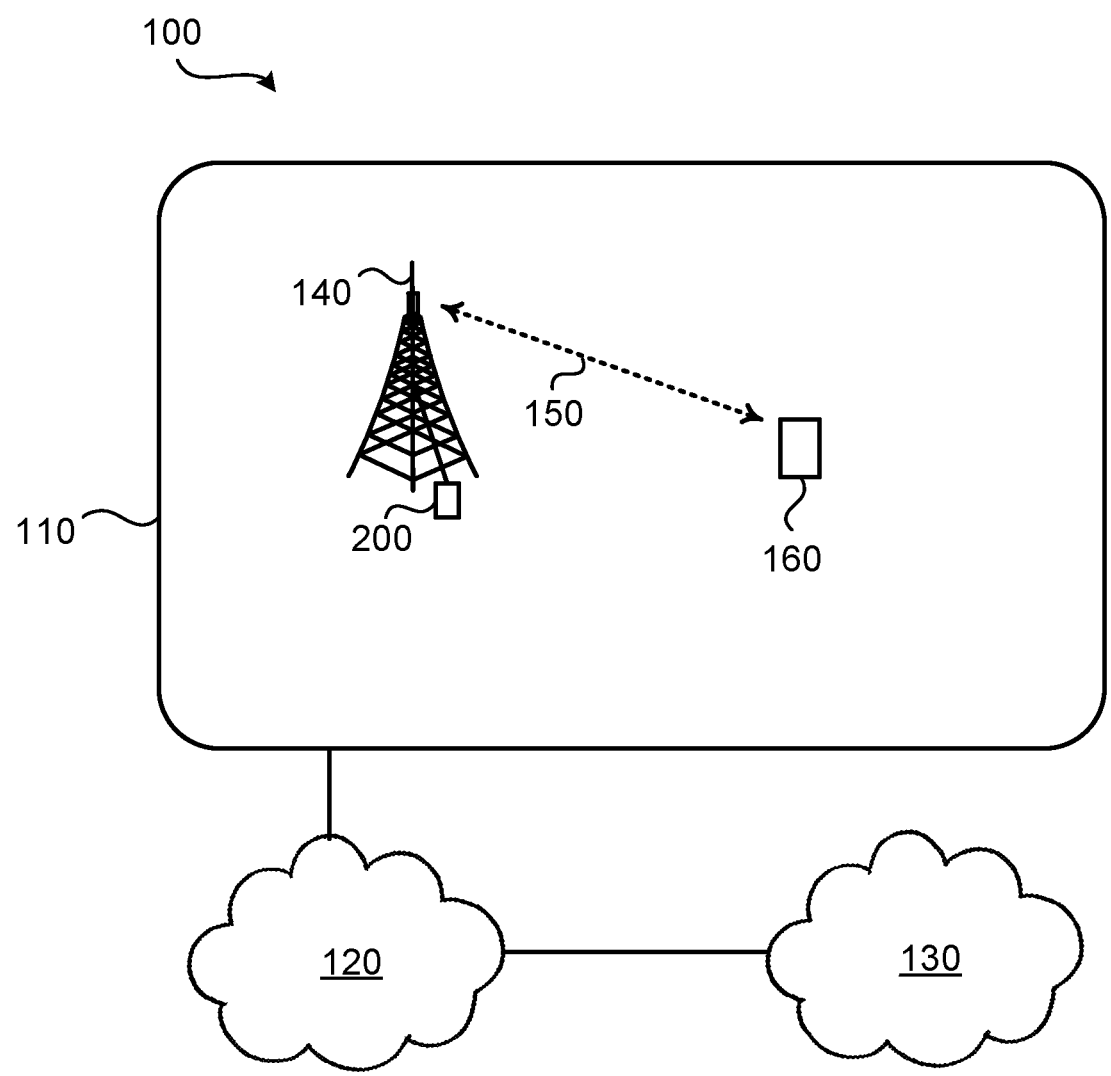
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a control node 200 configured to control a base station 140 that provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the base station 140, access services of, and exchange data with, the service network 130.

Examples of base stations 140 are radio access network nodes, radio base stations, base transceiver stations, Node Bs, evolved Node Bs, g Node Bs, access points, access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The control node 200 might comprise, be collocated with, integrated with, or be in operational communications with, the base station 140.

As disclosed above, there may be a need for efficient control of the average transmitted power for base stations 140 and other radio equipment.

Different RF EMF exposure standards and regulations may specify different times that the exposure should be averaged over, depending for example on the carrier frequency. For carrier frequencies between 100 kHz and 10 GHz, ICNIRP specifies an averaging time of 6 minutes. Above 10 GHz the averaging time is reduced with increasing carrier frequency, and is about 2 minutes at 30 GHz and about 0.5 minutes at 100 GHz. The standard IEEE C95.1-2005 on the other hand specifies an averaging time of 30 minutes for general public exposure in the frequency range from 100 MHz to 5 GHz.

A consequence of this is that any automatic average power back-off controller intended to keep the time-averaged power below a level that has be pre-determined to obtain compliance with an RF exposure regulation, should preferably cover the range of 0.5 minutes to 30 minutes.

There are several issues with currently available mechanisms that prevent a low complexity back-off power solution.

As a first example, the lack of a feedback control mechanism for back-off power control with uniform dynamic performance, when averaging times can be predefined within a range, typically given by [0.5, 30] minutes complicates the tuning of the back-off power control mechanism, since tabulation needs to be used for all involved parameters.

As a second example, the lack of a feedback control mechanism with a constant memory requirement for storage of power samples for average power computation complicates implementation, since storage of a very large number of power samples in a buffer is required when the averaging times are large and the selected sampling period is small.

The embodiments disclosed herein therefore relate to mechanisms for controlling total average transmission power of a radio base station 140. In order to obtain such mechanisms there is provided a control device 200, a method performed by the control device 200, a computer program product comprising code, for example in the form of a computer program, that when run on a control device 200, causes the control device 200 to perform the method.

Figure 2:
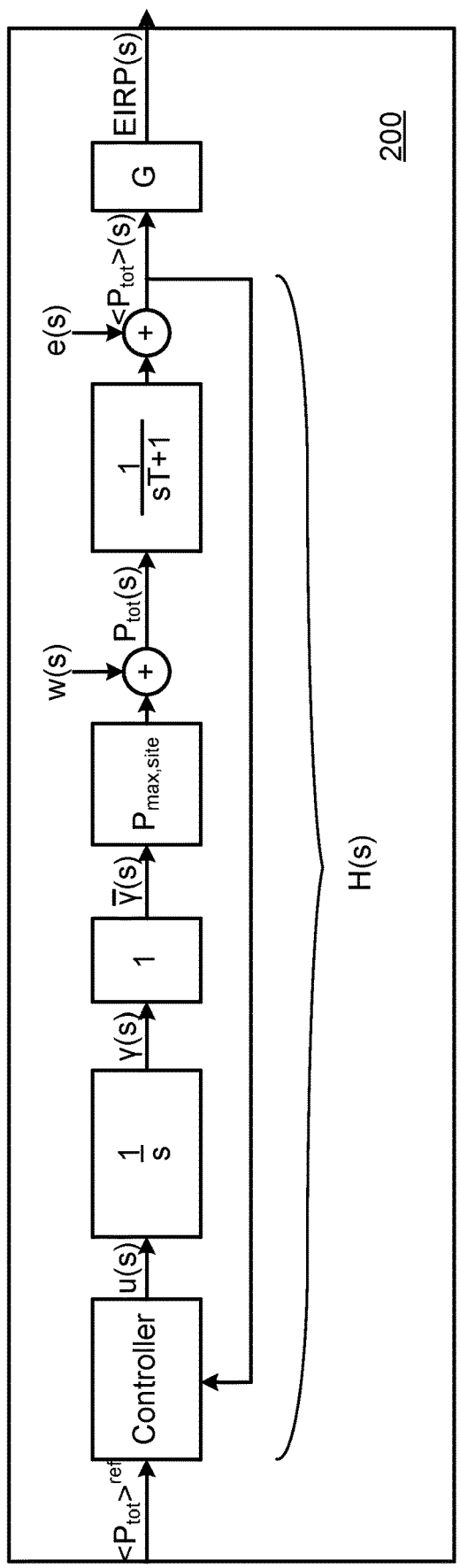
FIGS. 2, 4, and 5 are block diagrams of a control device according to embodiments.

FIG. 2 is a block diagram of the control node 200 where feedback control has been enabled by a back-off power control loop defined by a closed loop transfer function H(s). In FIG. 2, $\langle P_{tot} \rangle^{ref}$ denotes the setpoint for the averaged power (typically slightly less than the threshold value), 1/s denotes the actuator dynamics with any lower and upper limits inactive, $\bar{\gamma}(s)$ denotes the scheduler limitation after any lower and upper limitation (inactive in FIG. 2), $P_{max,site}$ denotes the maximal total power of the base station 140, w(s) denotes a disturbance representing predicted power errors, 1/(sT+1) represents an autoregressive, simplified model of the averaging of power, where T is the averaging time, $\langle P_{tot} \rangle$ (s) denotes the averaged total power, G denotes the antenna gain of the base station 140 and EIRP(s) denotes the EIRP. All quantities are in FIG. 2 expressed in the Laplace transform domain, which is allowed since the feedback control mechanism design is performed with constraints inactive. The momentary power is denoted $P_{tot}(s)$.

In some aspects the controller block is given by:

$$u(s) = CT(1+T_D s)(\langle P_{tot} \rangle (t) - \langle P_{tot} \rangle (s)).$$

Figure 4:
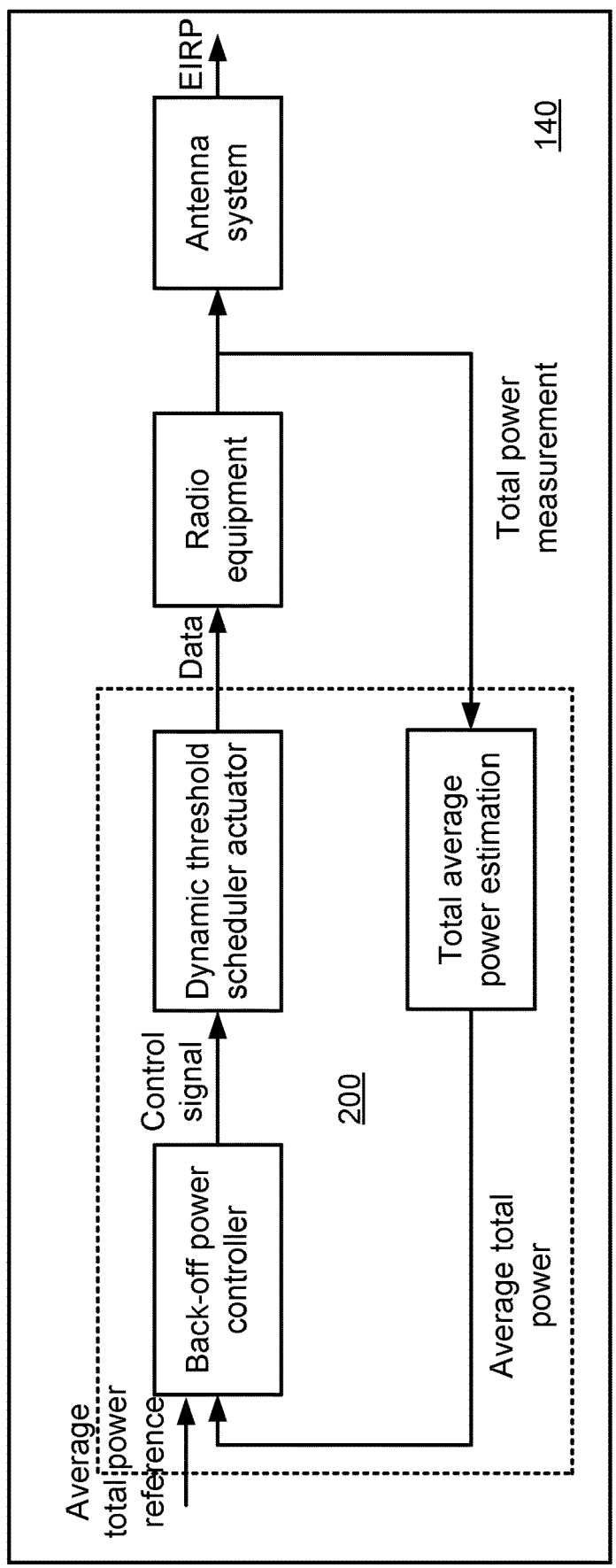

A control node 200 implementing this controller block is of PD type. C denotes the proportional gain, and $T_D$ the differentiation time. The poles of the closed loop system of FIG. 4 are given by the following second order equation:

$$s^2 + (1/T + P_{max,site} C T_D)s + P_{max,site} C = 0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as:

$$s^2 + (\alpha_1 + \alpha_2)s + \alpha_1 \alpha_2 = 0.$$

An identification of coefficients and solution of the resulting system of equations reveal that the proportional gain and differentiation time shall be selected as:

$$C = \frac{\alpha_1 \alpha_2}{P_{max,site}},$$

and:

$$T_D = \frac{\alpha_1 + \alpha_2 - \frac{1}{T}}{\alpha_1 \alpha_2}.$$

One reason for this choice is that a system with two negative real poles can be expected to be well damped, which is a result of a significant differentiation action. This might be advantageous when differentiation action is needed for fast back-off close to the determined threshold.

To implement the feedback control mechanism, $\langle P_{tot} \rangle^{ref}$, $\langle P_{tot} \rangle$ (t) and $\langle P_{tot}^{\cdot} \rangle$ (t) are needed. The herein disclosed embodiments provide novel ways as how to obtain $\langle P_{tot} \rangle$ (t) and $\langle P_{tot}^{\cdot} \rangle$ (t) such that the above disclosed issues are avoided.

Figure 3:
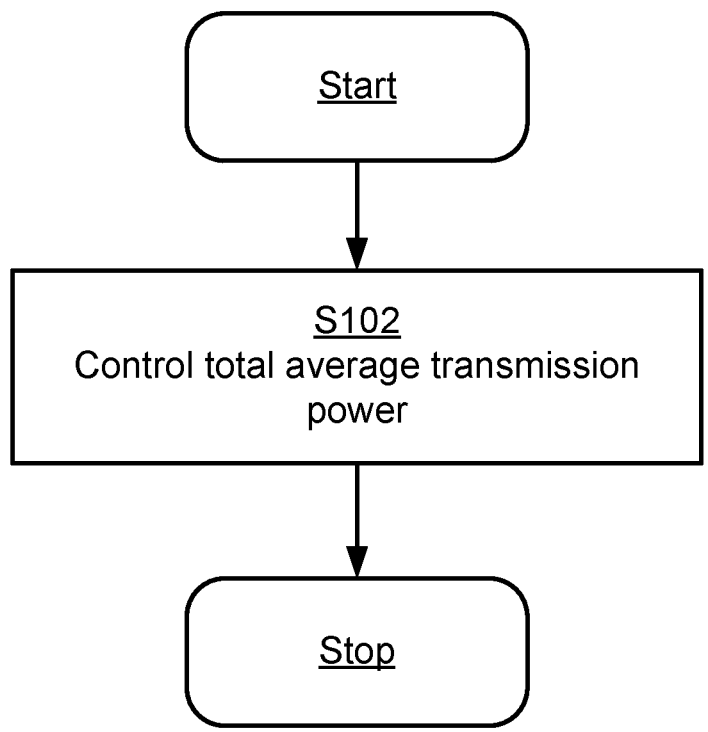
FIG. 3 is a flowchart of methods according to embodiments.

FIG. 3 is a flowchart illustrating embodiments of methods for controlling total average transmission power of a radio base station 140. The methods are performed by the control device 200. The methods are advantageously provided as computer programs 1720.

S102: The control device 200 performs control of total average transmission power $\langle P_{tot} \rangle$ (t) of the radio base station 140 according to a back-off power control loop.

In the back-off power control loop, a setpoint value $\langle P_{tot} \rangle^{ref}$ of the total average transmission power is compared with a value of the total average transmission power $\langle P_{tot} \rangle$ (t). The value of the total average transmission power $\langle P_{tot} \rangle$ (t) is computed over an averaging time T. Control parameters of the back-off power control loop are scaled proportionally to the inverse of the averaging time T. The control parameters pertain to a response time of the back-off power control loop.

Embodiments relating to further details of controlling total average transmission power of a radio base station 140 as performed by the control device 200 will now be disclosed.

In some aspects the control parameters of the back-off power control loop are scaled proportionally to a nominal value $T_0$ of the averaging time T. Further, in some aspects, each control parameter is scaled with respect to a nominal value of each control parameter.

There could be different values of the averaging time T. According to an embodiment, the averaging time T is between 0.5 minutes and 30 minutes. The scaling of the control parameters thereby results in uniform dynamic behaviour of the regulated average power, for all averaging times in the interval in which the averaging time T takes a value, such as in the interval [0.5, 30] minutes. Further, in some examples the nominal averaging time $T_0$ is 6 minutes.

Further aspects of scaling of the control parameters of the back-off power control loop will now be disclosed.

In general terms, when the averaging time T is increased, the rate of variation of $\langle P_{tot} \rangle$ (t) is reduced and the range of $\langle P_{tot}^{\cdot} \rangle$ (t) is reduced as well. This follows e.g. from the dynamic model of the averaging process that is given by 1/(sT+1). This means that the agility of the controller can be reduced as well, or it will tend to regulate unnecessarily fast. Such fast control is not needed for longer averaging times T, and it is negative from a stability point of view of the back-off control loop. A control loop with the same behavior for different averaging times would also be beneficial from a maintenance point of view, since then the back-off power control performance would become normalized between radio access technologies (RATs).

To achieve this goal it is noted that the absolute values of the desired poles, i.e. $\alpha_1$ and $\alpha_2$, are proportional to the bandwidth of the controller, i.e. inversely proportional to the response time of the controller. Hence, according to an embodiment, the back-off power control loop is defined by a closed loop transfer function H(s), and at least some of the control parameters correspond to poles $\alpha_1$ and $\alpha_2$ of the closed loop transfer function. Therefore, if the averaging time is increased, the bandwidth of the control loop should be decreased proportionally. This means that the poles might be decreased proportionally. In addition, the bandwidth of the estimator for $\langle P_{tot}^{\cdot} \rangle$ (t) might to be reduced proportionally.

Particularly, according to an embodiment, the control parameters are scaled by the poles $\alpha_1$ and $\alpha_2$ being scaled from nominal values $\alpha_{1,0}$ and $\alpha_{2,0}$ to scaled values $\alpha_{1,scaled}$ and $\alpha_{2,scaled}$ according to:

$$\alpha_{1,scaled} = \frac{T_0}{T}\alpha_{1,0},$$

and $$\alpha_{2,scaled} = \frac{T_0}{T}\alpha_{2,0}.$$

Further, in some aspects the back-off power control loop has a nominal derivative estimation pole location $\alpha_0$ for the nominal averaging time $T_0$. According to an embodiment, the control parameters are scaled by the nominal derivative estimation pole location $\alpha_0$ being scaled to a derivative estimator pole value $\alpha_{scaled}$ according to:

$$\alpha_{scaled} = \frac{T_0}{T}\alpha_0.$$

In some aspects, the back-off power control loop has a proportional gain parameter C and a differentiation time parameter $T_D$. According to an embodiment, one of the control parameters corresponds to the proportional gain parameter C and another of the control parameters corresponds the differentiation time parameter $T_D$. The control parameters might then be scaled, with the proportional gain parameter C being scaled from a nominal value $C_0$ to a scaled value $C_{scaled}$, and the differentiation time parameter $T_D$ being scaled from a nominal value $T_{D,0}$ to a scaled value $T_{D,scaled}$. Denote by $P_{max,site}$ the maximum allowed transmission power of the radio base station 140. Then, according to an embodiment:

$$C_{scaled} = \frac{\alpha_{1,scaled}\alpha_{2,scald}}{P_{max,site}},$$

Further, according to an embodiment:

$$T_{D,scaled} = \frac{\alpha_{1,scaled} + \alpha_{2,scaled} - \frac{1}{T}}{\alpha_{1,scaled}\alpha_{2,scaled}}.$$

Then, when performing the control in step S102 a back-off power control loop according to the following might be applied (where e(t) is the control error):

$$y(t)=y(t-T_{S,scaled})-\alpha_{scaled}T_S y(t-T_{S,scaled})-$$

$$\alpha_{scaled}(\langle P_{tot}\rangle(t)-\langle P_{tot}\rangle(t-T_{S,scaled})$$

$$u(t)=C_{scaled}Te(t)-C_{scaled}TT_{D,scaled}\max(0,y(t)).$$

The scaled value of the sampling period, $T_{S,scaled}$, is described in detail next. In addition to scaling of the control parameters of the back-off power control loop, also other parameters pertinent to the back-off power control loop might be scaled. Aspects relating thereto will now be disclosed.

In some aspects the averaging time T defines the length of a sliding window within which all power values for determining the value of the total average transmission power $\langle P_{tot} \rangle$ (t) are sampled. The power values are sampled according to a sampling period $T_S$. Then, according to an embodiment, the sampling period $T_S$ is, in the back-off power control loop, scaled inversely proportional to the nominal value $T_0$. Hence, in some aspects the sampling period of the power and the number of samples in the averaging window used for measurement of average power are scaled, rendering a constant and low number of power samples in the averaging window, even when the averaging time varies.

In more detail, according to regulatory requirements, a sliding window needs to be used for average power estimation. In some examples, an update rate of the averaged power $\langle P_{tot} \rangle$ (t) and the derivative $\langle \dot{P}_{tot} \rangle$ (t) is given by the sampling period of the back-off power control loop. Simulations indicate that a sampling period of 0.1 seconds might be low enough when the averaging time T is 1 minute, i.e. 500-1000 samples is typically needed. Even this low value of the averaging time T might cause memory problems in case of implementation of the average power estimation in a digital signal processor (DSP) core. One reason is that memory dedicated to a DSP core is a very scarce resource. Then, in case the averaging time would be 30 minutes instead, 15000-30000 samples would be needed to be stored in the memory, requiring almost all memory available in some DSP hardware.

Advantageously, by scaling the sampling period $T_S$ the memory consumption can be reduced, enabling an external memory implementation as compared to the use of DSP core cache memory. Advantageously, by scaling the sampling period $T_S$ the computational complexity can be reduced, since a low and constant number of samples in the averaging window requires fewer power samples to be computed.

It is noted that all power samples in the averaging window needs to be stored so that a new value of the average power can be computed by removal of the oldest power sample from the averaging, and addition of a new power sample. This is formulated in the following equations, where $t_n$ is the current time, $T_S$ is the sampling period, N is the number of samples in the averaging computation (the averaging window size), and n is a running index indicating how many updates have been made from the start of the averaging (the time when the averaging window is filling up is a little different from after that):

$$t_{n+1} = t_n + T_S,$$

$$T = NT_s$$

$$\langle P_{tot}\rangle(t_{n+1}) = \frac{n}{n+1}\langle P_{tot}\rangle(t_n) + \frac{1}{n+1}P_{tot}(t_n), n \leq N$$

$$\langle P_{tot}\rangle(t_{n+1}) = \langle P_{tot}\rangle(t_n) + \frac{1}{N}(P_{tot}(t_n) - P_{tot}(t_n - NT_S)), n > N.$$

This implementation has the advantage of a low computational complexity. However, numerical errors caused by round off over time can be built up. Therefore, the average power estimation might be determined as:

$$\langle P_{tot}\rangle(t_N) = \frac{1}{N}\sum_{n=1}^{N} P_{tot}(t_n).$$

To avoid a very large value of N, and to in fact use the same value of N for all averaging times T, the sampling period $T_S$ can be scaled. Hence, in some aspects the sampling period $T_S$ is scaled such that the number of power values sampled within the averaging window is independent of the averaging time T.

In some aspects, a nominal averaging time $T_0$ is selected, and a nominal sampling period $T_{S,0}$ of the back-off power control loop suitable for the averaging time is selected. That is, according to an embodiment, the sampling period $T_S$ is scaled from a nominal sampling period value $T_{S,0}$ to a scaled value $T_{S,scaled}$. According to an embodiment, $T_{S,scaled}$ is determined according to:

$$T_{S,scaled} = \frac{T}{T_0} T_{S,0}.$$

A computation of the number of samples in the averaging window now yields:

$$N_{scaled} = \left(\frac{T}{T_{S,scaled}}\right) = \text{ceil}\left(\frac{T}{\frac{T}{T_0}T_{S,0}}\right) = \text{ceil}\left(\frac{T_0}{T_{S,0}}\right) = N_0.$$

Here $N_0$ is the number of samples obtained for the nominal sampling period and nominal averaging time. Hence the same number of samples can be used for any other averaging time. This has the advantage that the number of samples in the averaging window can be allocated as static memory and that the number of samples does not become too large which simplifies the implementation and normalizes the performance. The averaging performance is thus unified over different averaging times, and thereby, different RATs. Hence $N=N_0$ can be used for all averaging times T.

Further aspects of how to perform the control in step S102 will now be disclosed.

In some aspects, performing the control in step S102 comprises filtering, by application of at least one filter, power values for determining the value of a dynamic threshold for limitation of next total average transmission power and wherein the filter is defined by at least some of the control parameters. This is because the control loop determines a dynamic threshold value over which the next average power is not allowed to be scheduled.

There could be different types of controllers used in step S102.

In some aspects the controller is of proportional-derivative (PD) type. That is, according to an embodiment the control in step S102 is of PD type.

In some aspects the controller is of derivative (D) type. That is, according to an embodiment the control in step S102 is of D type. Thus, in some aspects only differential control is allowed.

In some aspects the average output power applied to the base station 140 is limited. Particularly, according to an embodiment the average output power applied to the base station 140 is limited by a resource factor value $\gamma(t)$. In more detail, in order to get a smooth behavior of the limiting resource threshold applied in the scheduler to limit the averaged output power, it might be rate controlled. That means that the control signal commands adjustments to the limiter, making it increase or decrease, typically in small steps. The dynamics of the actuator mechanism might therefore be determined to be:

$$\dot{\gamma}(t) = u(t),$$

where $\gamma(t)$ is the resource threshold and where $u(t)$ is the control signal above expressed in the time domain. The resource threshold is decoupled from the scheduler algorithms themselves, and just expresses a fractional limitation of the scheduler not to use more than a fraction $\gamma(t)$ of its total resources. The scheduler may then limit the number of transmission resources it uses, or limit any other quantity that correlates well with the momentary output power.

In some aspects the resource factor value $\gamma(t)$ is set to its minimum value when the value of average total transmission power is larger than a power threshold value. In more detail, the maximum value of $\gamma(t)$ is 1 since it is to express a fraction of the maximum amount of scheduler resources. There might also be a need to limit its lower value in order to avoid that the dynamic feedback control mechanism reduces it to an unphysical value below 0. The following scheduler threshold limitation might therefore be applied:

$$\gamma_{low} \leq \gamma(t) \leq 1.$$

In some aspects cell-wide control of average output power of the base station 140 is performed based on the average total transmission power.

In some aspects a supervision mechanism is employed for enabling and disabling the proposed controlling total average transmission power of the base station 140. That is, according to an embodiment the control in step S102 is selectively enabled and disabled. Further, the resource factor value $\gamma(t)$ might be set to its maximum value when performing the control is enabled.

There could be different ways to determine when to enable and disable the control. In some aspects a comparison to threshold values is made in order to determine when to enable and disable the control. In particular, according to an embodiment, performing the control (as in step S102) is enabled when the value of the average total transmission power is larger than a fractional first power threshold value $\delta_1$, and performing the control is disabled when the value of the average total transmission power is smaller than a second fractional power threshold value $\delta_2$, where $\delta_2 \leq \delta_1$. In more detail, one scope of the proposed control is to control the averaged output power to be below the regulatory requirement. When this is not needed, the proposed control could be disabled, leaving the base station 140 to operate without any scheduler limitation. Therefore, according to an example: 1) Enable the control when $\langle P_{tot} \rangle(t) > \delta_1 P_{max,site}$, and set $\gamma(t)=1$, and 2) Disable the control when $\langle P_{tot} \rangle(t) < \delta_2 P_{max,site}$. In some aspects the values fulfil: $\delta_2 P_{max,site} \leq \langle P_{tot} \rangle^{ref} \leq \delta_1 P_{max,site}$, where $P_{max,site}$ denotes the maximum transmission power of the site comprising the base station 140.

There may be different ways to obtain the values of total transmission power $P_{tot}(t)$.

In some aspect the values of total transmission power $P_{tot}(t)$ are measured. FIG. 4 illustrates an architecture of the radio base station 140 where a measured averaged total power feedback from the antenna system of the radio base station 140 is used. According to FIG. 4, the radio base station 140 comprises a back-off power controller, a dynamic threshold scheduler actuator, a total average transmission power estimator, radio equipment and an antenna system (such as an AAS), where the radio equipment and the antenna system are separated from the remaining components over an interface, such as the C2 interface or similar. The back-off power controller, the dynamic threshold scheduler actuator, and the total average transmission power estimator are part of the control node 200. Particularly, in some examples the values of total transmission power are measured at input to the antenna system of the base station 140. In this respect, the total output power of an antenna system, over all antenna elements of the antenna system, can be measured in the radio equipment, just before the antenna elements of the antenna system. In some examples this can be done by couplers that measure the radio signal amplitude at each signal path to an antenna element. These amplitudes can then be combined into a total output power of the radio equipment, with the antenna gain removed. This quantity is denoted $P_{tot}(t)$.

Figure 5:
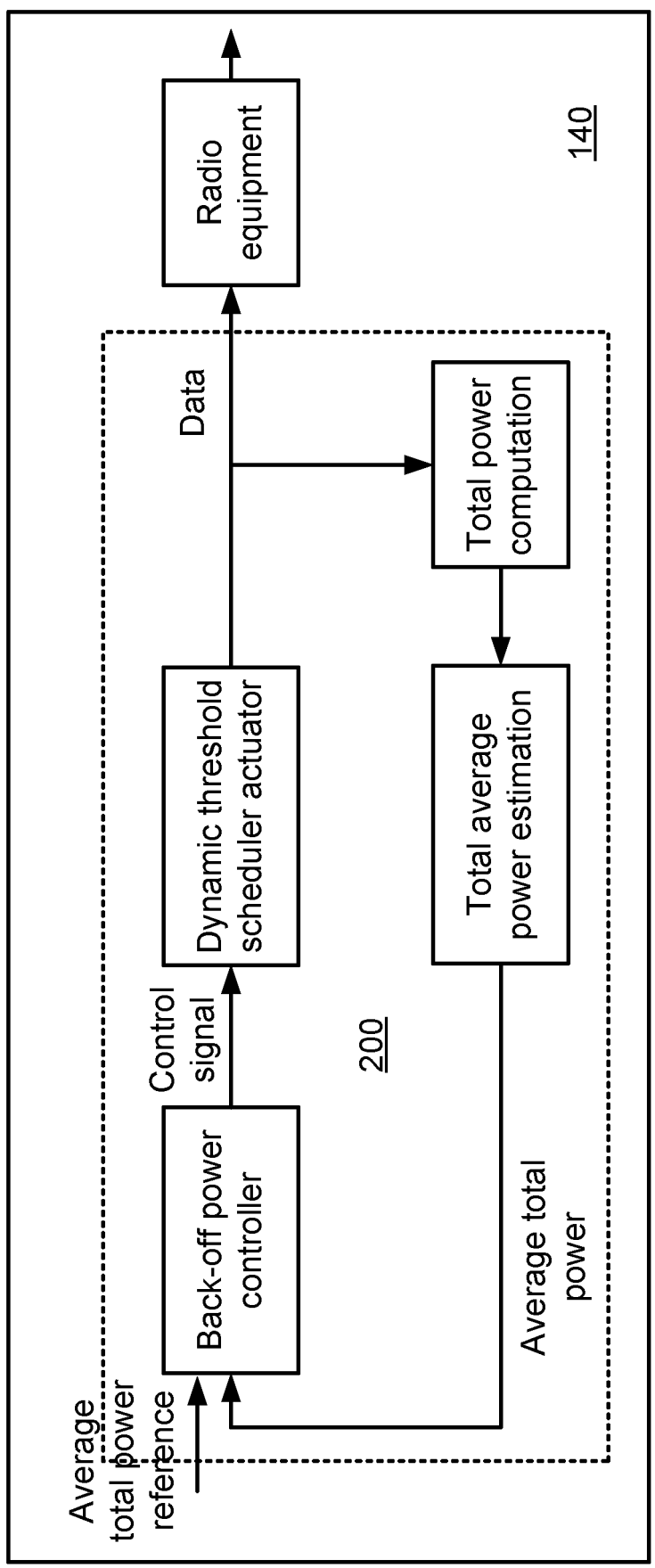

In other aspects the values of total transmission power $P_{tot}(t)$ are predicted. FIG. 5 illustrates an architecture of the radio base station 140 where a predicted averaged total power is used. According to FIG. 5, the radio base station 140 comprises a back-off power controller, a dynamic threshold scheduler actuator, a total average transmission power estimator, a total transmission power computer, and radio equipment, where the radio equipment is separated from the remaining components over an interface, such as the C2 interface or similar. The back-off power controller, the dynamic threshold scheduler actuator, the total average transmission power estimator, and the total transmission power computer are part of the control node 200. The antenna system (such as an AAS) is then external to the radio base station 140. For example, the values of total transmission power $P_{tot}(t)$ can be predicted using information available in the scheduler or elsewhere in baseband. Such a quantity could be obtained, e.g. by summing up the momentary scheduled power as estimated by the fraction of resources used at each time instant t, over the time T.

Simulation results of scaling of control parameters of the back-off power control loop will now be presented with reference to FIGS. 6, 7, 8, 9, 10, and 11.

In order to illustrate the performance, a reference simulation was first performed for the nominal case with an averaging window of 6 minutes using a sampling period of 0.5 seconds. The cases with 2 minutes averaging time and 30 minutes averaging time were then simulated. The following typical values were used in the simulations:

$$P_{max,site} = 200 \ W, \ P_{max,regulatory} = 50 \ W, \ \delta_1 = 0.225,$$

$$\delta_2 = 0.170, \ \langle P_{tot} \rangle^{ref} = 0.215 \cdot P_{max,site} = 43 \ W, \ \text{margin} = 0.01,$$

$$\alpha_{1,0} = \frac{4}{T}, \ \alpha_{2,0} = \frac{1}{50}, \ \alpha_0 = 0.05.$$

Figure 6:
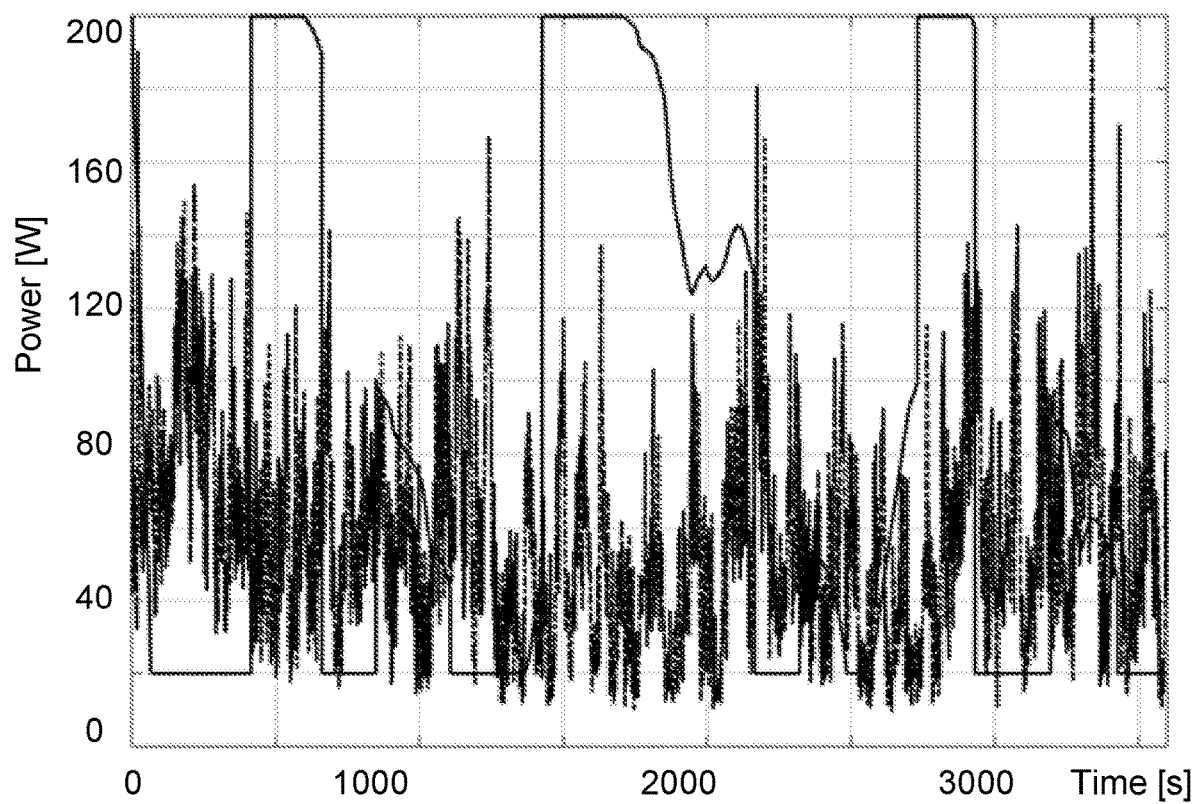
FIGS. 6-14 shows simulation results according to embodiments.
Figure 7:
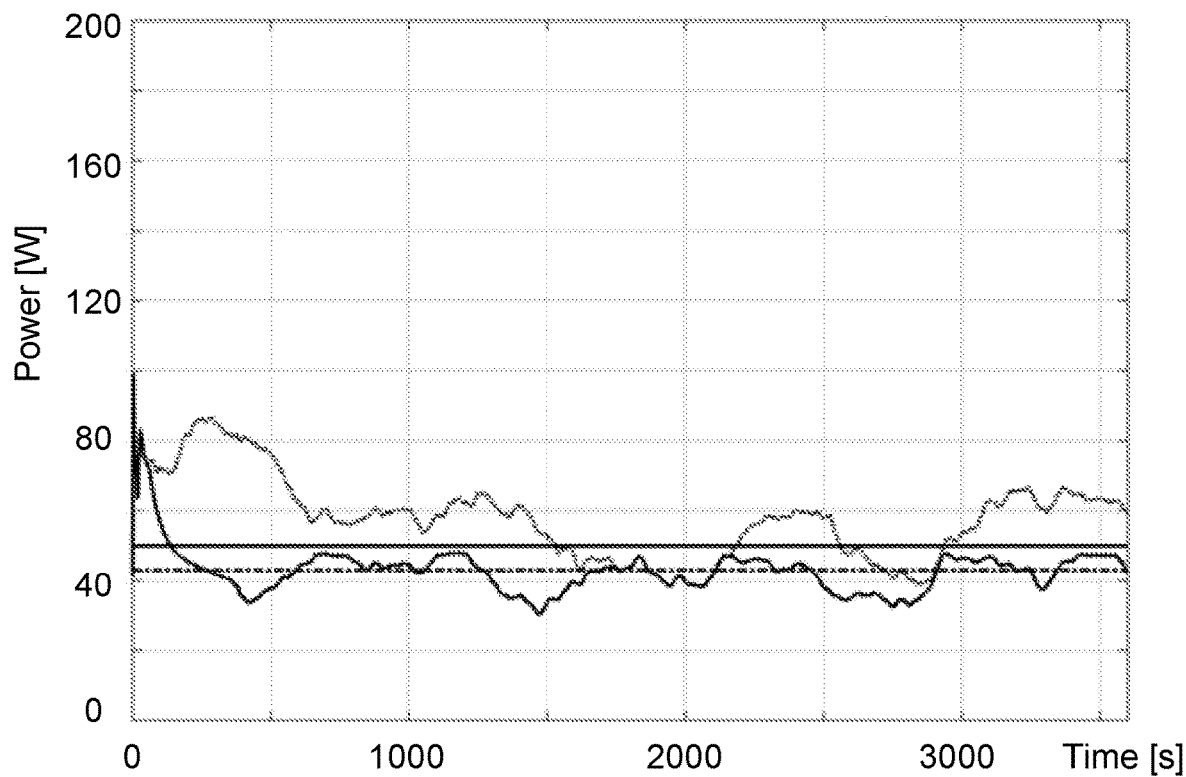

The result of the reference simulation is shown in FIGS. 6 and 7. FIG. 6 shows the uncontrolled momentary power (dotted) and the dynamic threshold (solid) for an averaging time of 6 minutes, and with 720 samples in the averaging window). FIG. 7 shows the regulatory limit (solid), the reference power for the back-off controller (dashed-dotted), the uncontrolled average power (dotted), and the controlled average power (solid)). It can be seen that the threshold varies smoothly. The back-off controller works as intended and keeps the average power well below the regulatory threshold of 50 W.

The back-off controller was then applied with an averaging time of 2 minutes.

Figure 8:
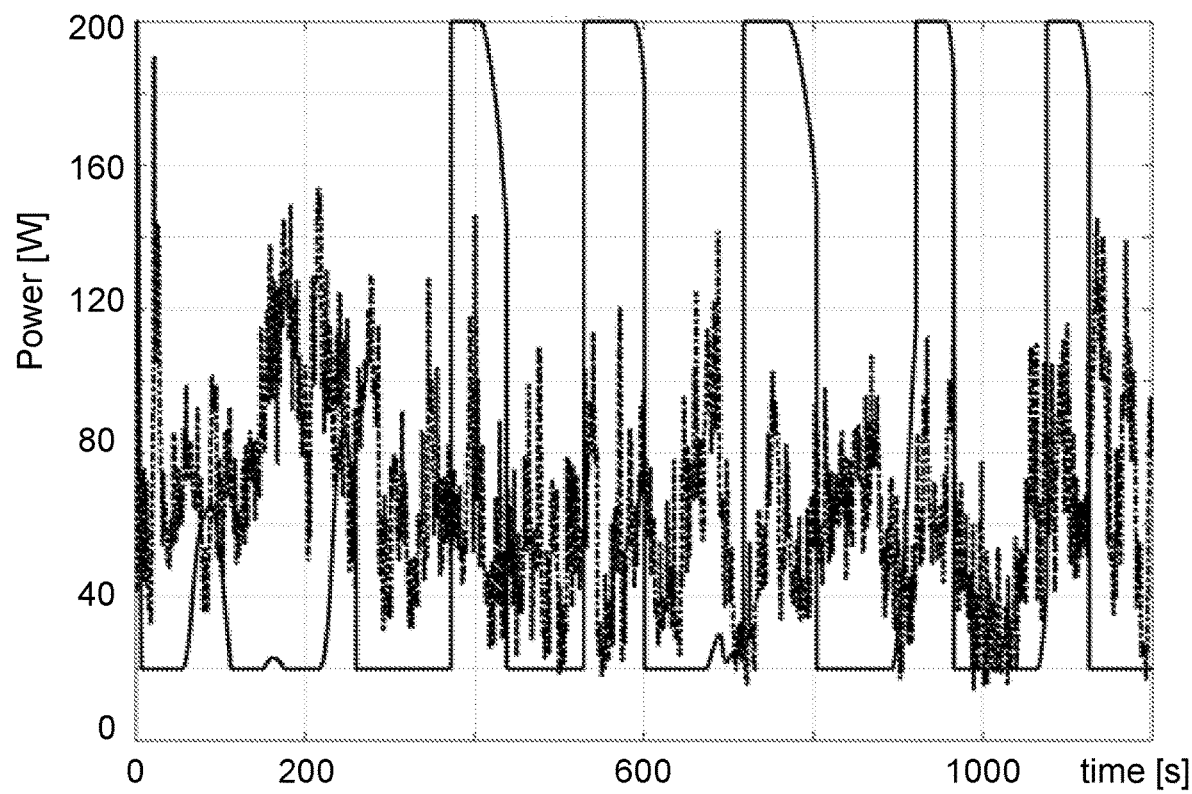
Figure 9:
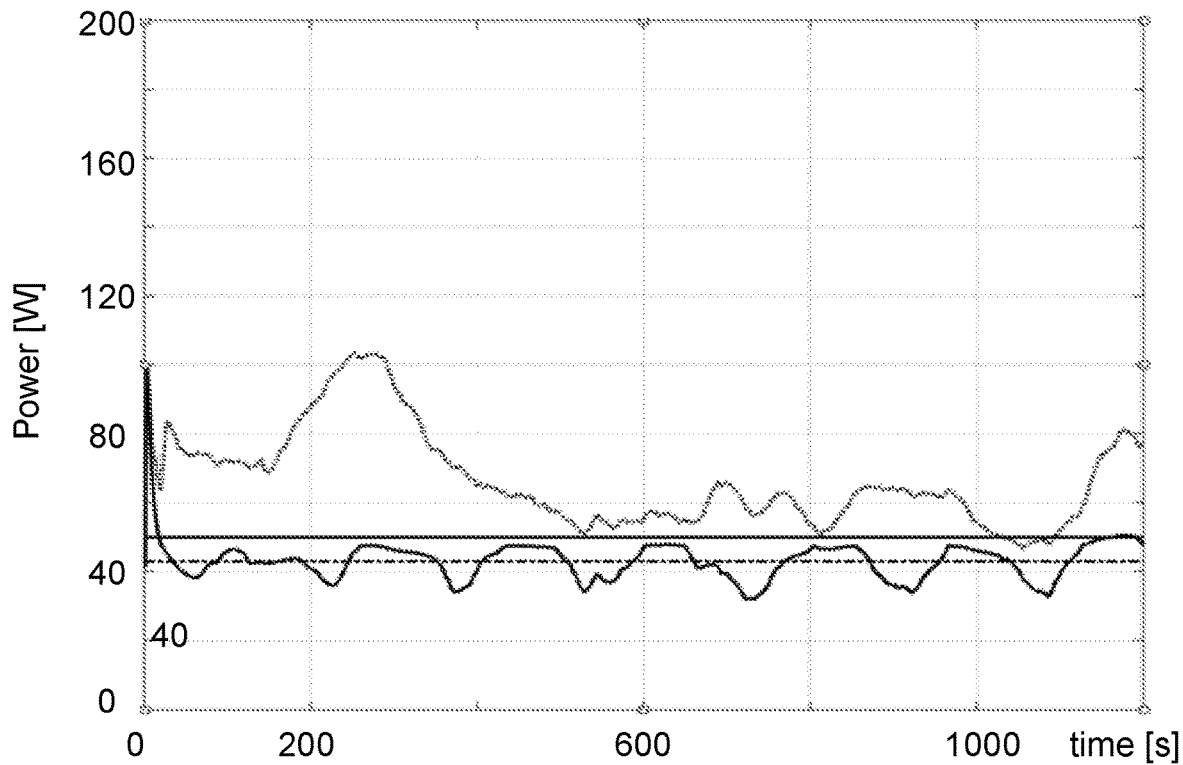

The result with scaling on appears in FIGS. 8 and 9. FIG. 8 shows the uncontrolled momentary power (dotted) and the dynamic threshold (solid) with 720 samples in the averaging window. FIG. 9 shows the regulatory limit (solid), the reference power for the back-off controller (dashed-dotted), the uncontrolled average power (dotted), and the controlled average power (solid).

Figure 10:
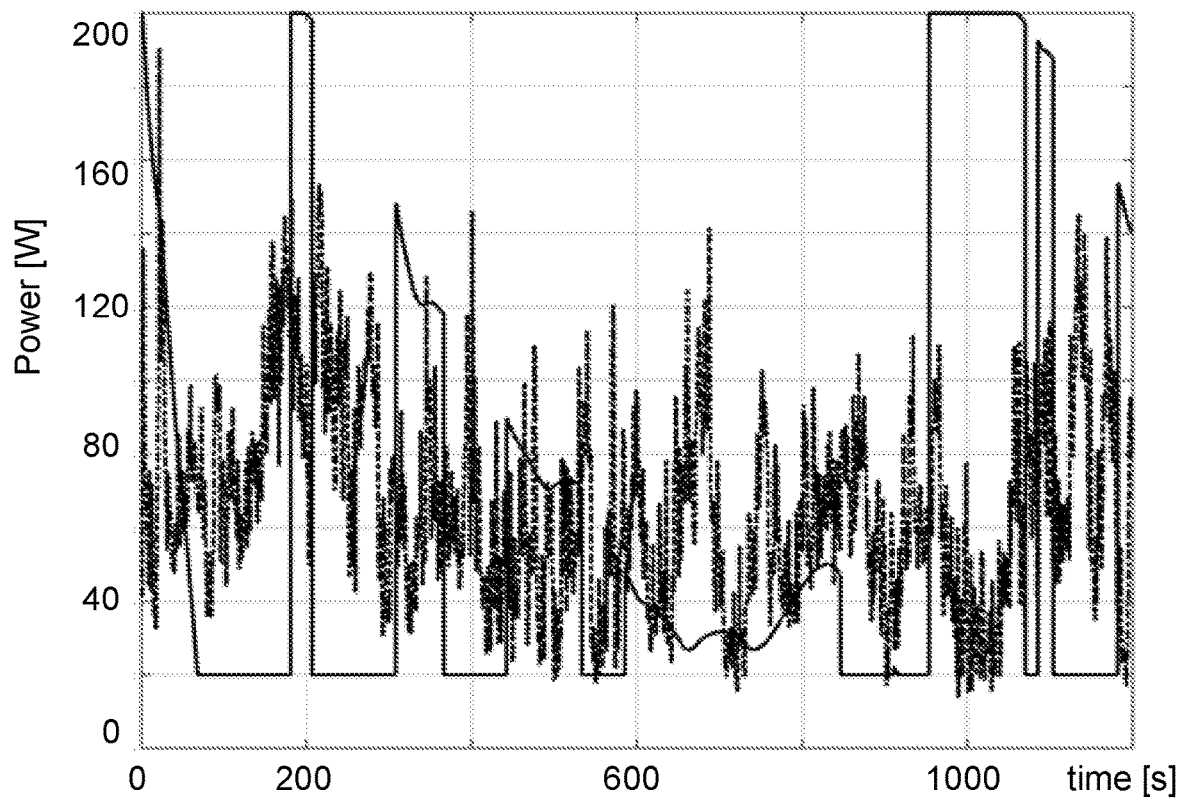
Figure 11:
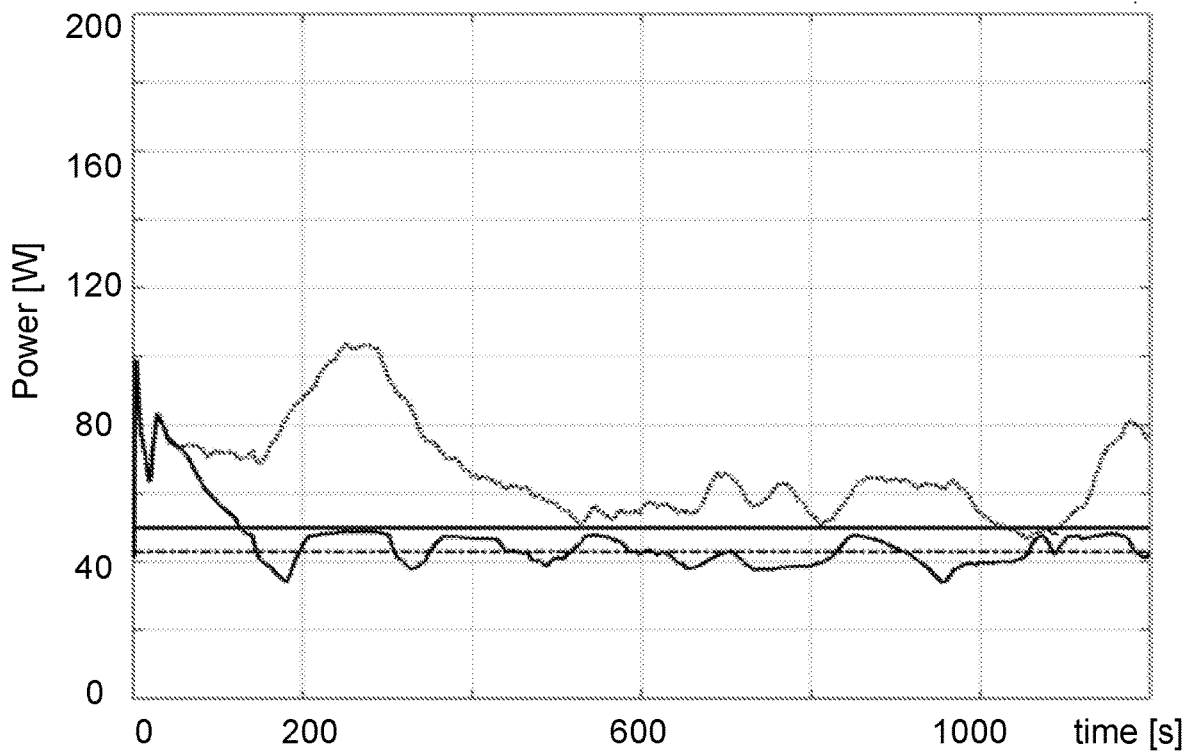

The result with scaling off appears in FIGS. 10 and 11. FIG. 10 shows the uncontrolled momentary power (dotted) and the dynamic threshold (solid) with 720 samples in the averaging window. FIG. 11 shows the regulatory limit (solid), the reference power for the back-off controller (dashed-dotted), the uncontrolled average power (dotted), and the controlled average power (solid)).

When comparing FIG. 8 and FIG. 10, it can be seen that when scaling is on, the controller is inactive for longer periods of time, which should imply a capacity benefit, as compared to when scaling is off. Regulation also appears to be more symmetric and well tuned in FIG. 9 as compared to FIG. 11. This could be explained by the significantly slower control shown by the threshold in FIG. 10 than in FIG. 8.

The back-off controller was also tested with an averaging time of 30 minutes with similar results.

Figure 12:
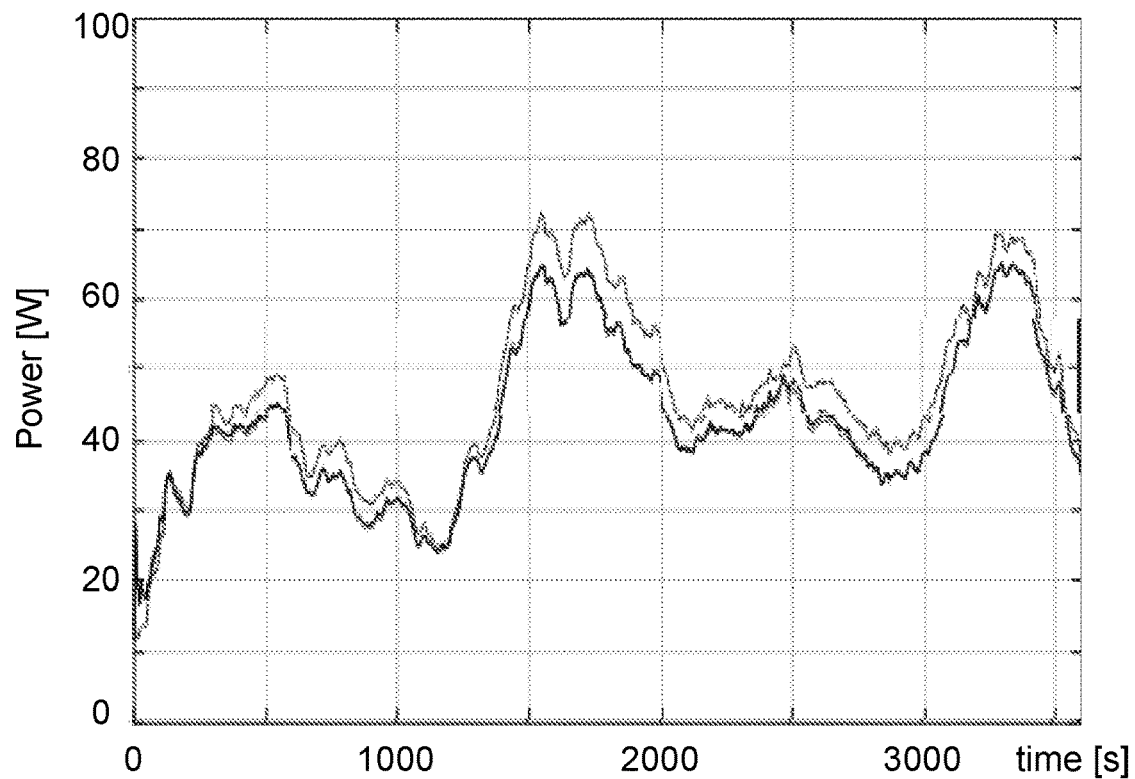
Figure 13:
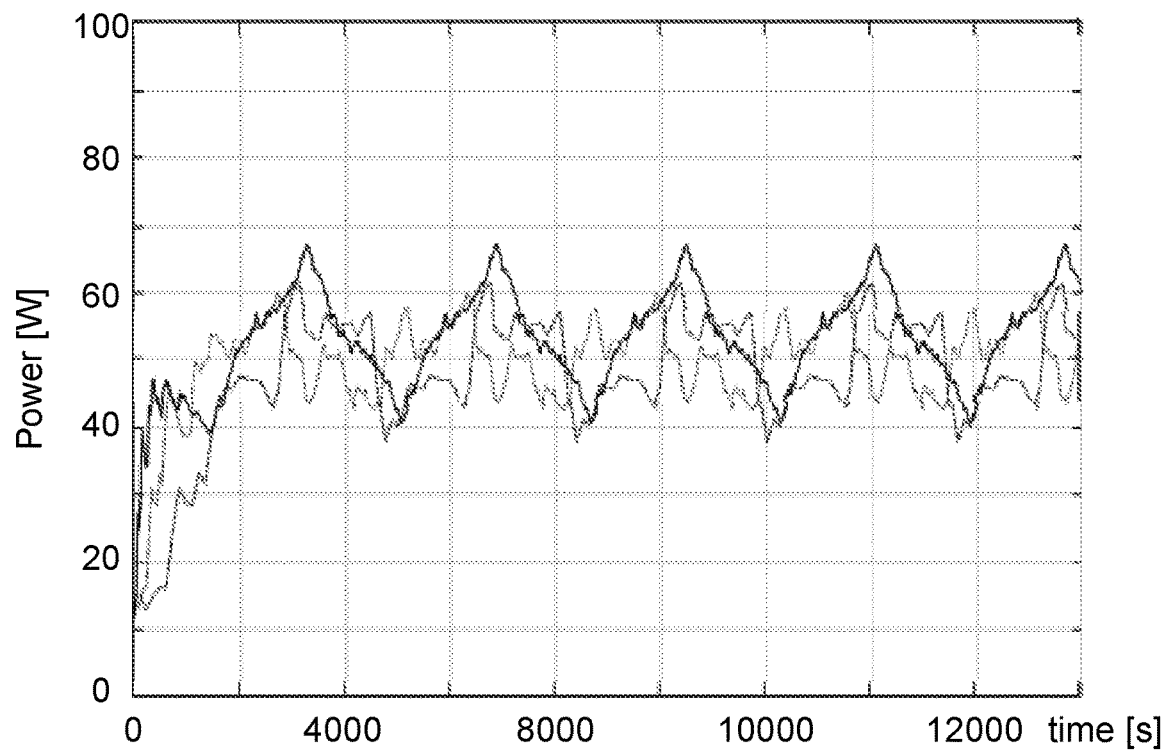
Figure 14:
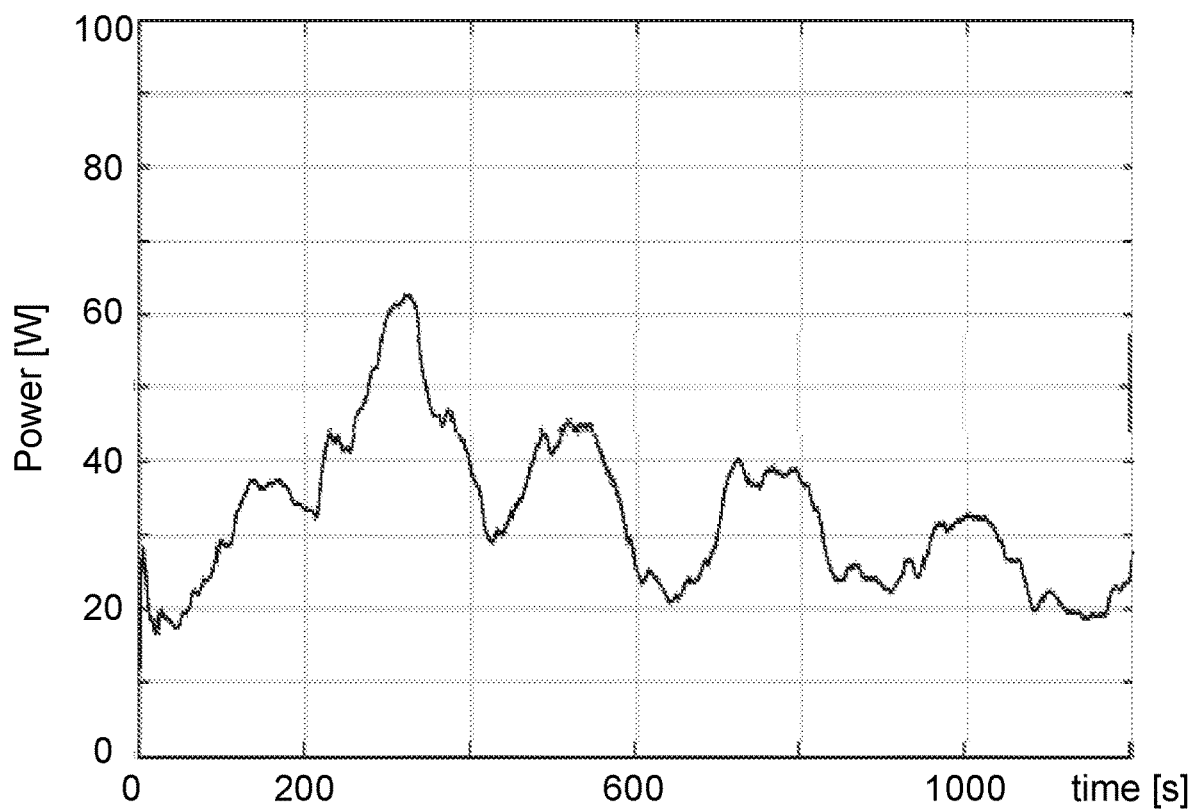

Simulation results of scaling of the sampling period $T_S$ will now be presented with reference to FIGS. 12, 13, and 14.

In order to study how the scaling of the sampling period $T_S$ performs, when it comes to normalizing the number of samples in the averaging window, three cases were simulated with averaging times being 2 minutes, 6 minutes and 30 minutes. The uncontrolled average power that resulted is shown in FIGS. 12-14.

FIG. 12 shows the uncontrolled average power for an averaging window covering 6 minutes. The figure compares the case with 720 samples in the window (solid), 180 samples in the window (dotted), and 72 samples in the window (dashed-dotted).

FIG. 13 shows the uncontrolled average power for an averaging window covering 30 minutes, with scaling of the sampling period $T_S$. The figure compares the case with 720 samples in the window (solid), 180 samples in the window (dotted), and 72 samples in the window (dashed-dotted).

FIG. 14 shows the uncontrolled average power for an averaging window covering 2 minutes, with scaling of the sampling period $T_S$. The figure compares the case with 720 samples in the window (solid), 180 samples in the window (dotted), and 72 samples in the window (dashed-dotted).

The accuracy varies with the averaging time, and it seems that the longer the averaging time, the more samples in the averaging window may be needed. An explanation may be that a longer window may cover more traffic variations. However, a nominal sampling period of 0.5 seconds seems to provide good accuracy in all cases. This corresponds to having 720 power samples in the averaging window.

Figure 15:
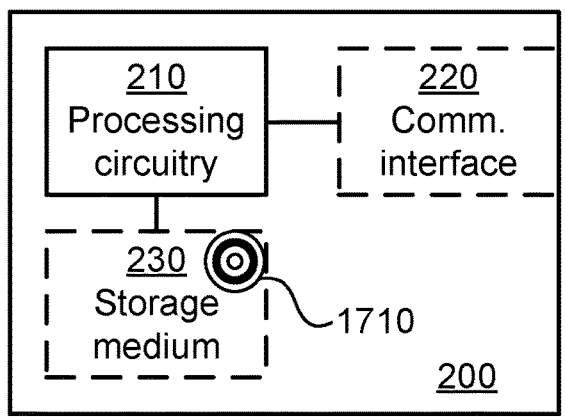
FIG. 15 is a schematic diagram showing functional units of a control device according to an embodiment.

FIG. 15 schematically illustrates, in terms of a number of functional units, the components of a control device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1710 (as in FIG. 17), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 200 to perform a set of operations, or steps, as disclosed above. For example, the storage medium 230 may store the set of operations, and the processing circuitry 210 may be configured to retrieve the set of operations from the storage medium 230 to cause the control device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 200 may further comprise a communications interface 220 at least configured for communications with other entities, nodes, functions, and devices. As such the communications interface 220 may comprise one or more transmitters and receivers, comprising analogue and digital components. The processing circuitry 210 controls the general operation of the control device 200 e.g. by sending data and control signals to the communications interface 220 and the storage medium 230, by receiving data and reports from the communications interface 220, and by retrieving data and instructions from the storage medium 230. Other components, as well as the related functionality, of the control device 200 are omitted in order not to obscure the concepts presented herein.

Figure 16:
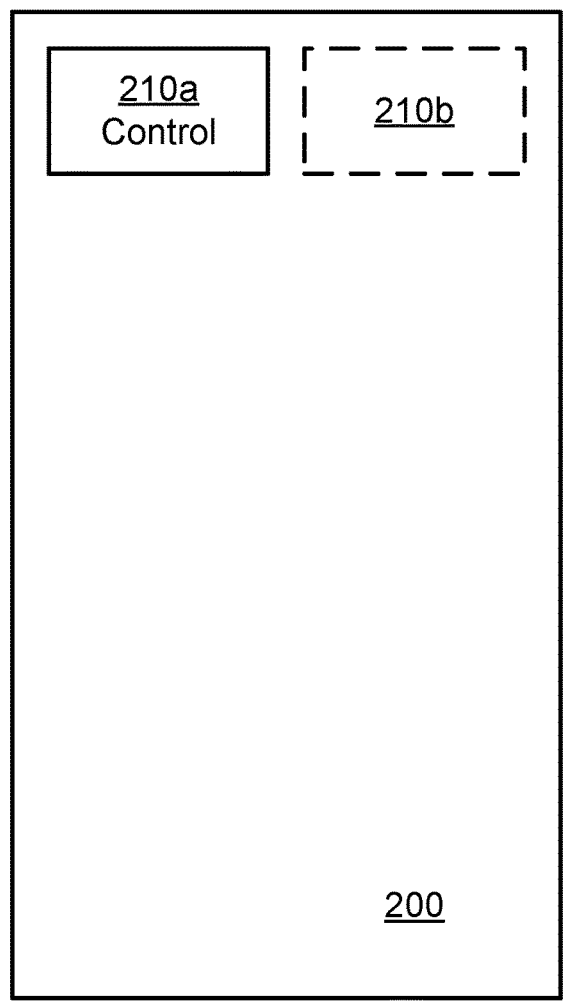
FIG. 16 is a schematic diagram showing functional modules of a control device according to an embodiment.

FIG. 16 schematically illustrates, in terms of a number of functional modules, the components of a control device 200 according to an embodiment. The control device 200 of FIG. 16 comprises a control module 210a configured to perform step S102. The control device 200 of FIG. 16 may further comprise a number of optional functional modules, such as symbolized by functional module 210b. In general terms, each functional module 210a-210b may in one embodiment be implemented only in hardware and in another embodiment with the help of software, i.e., the latter embodiment having computer program instructions stored on the storage medium 230 which when run on the processing circuitry makes the control device 200 perform the corresponding steps mentioned above in conjunction with FIG. 16. It should also be mentioned that even though the modules correspond to parts of a computer program, they do not need to be separate modules therein, but the way in which they are implemented in software is dependent on the programming language used. Preferably, one or more or all functional modules 210a-210b may be implemented by the processing circuitry 210, possibly in cooperation with the communications interface 220 and/or the storage medium 230. The processing circuitry 210 may thus be configured to from the storage medium 230 fetch instructions as provided by a functional module 210a-210b and to execute these instructions, thereby performing any steps as disclosed herein.

The control device 200 may be provided as a standalone device or as a part of at least one further device. For example, the control device 200 may be provided in a node of the radio access network 110 or in a node of the core network 120. Alternatively, functionality of the control device 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time. In this respect, at least part of the control device 200 may reside in the radio access network, such as in the radio access network node, for cases when embodiments as disclosed herein are performed in real time.

Thus, a first portion of the instructions performed by the control device 200 may be executed in a first device, and a second portion of the of the instructions performed by the control device 200 may be executed in a second device; the herein disclosed embodiments are not limited to any particular number of devices on which the instructions performed by the control device 200 may be executed. Hence, the methods according to the herein disclosed embodiments are suitable to be performed by a control device 200 residing in a cloud computational environment. Therefore, although a single processing circuitry 210 is illustrated in FIG. 15 the processing circuitry 210 may be distributed among a plurality of devices, or nodes. The same applies to the functional modules 210a-210b of FIG. 16 and the computer program 1720 of FIG. 17.

Figure 17:
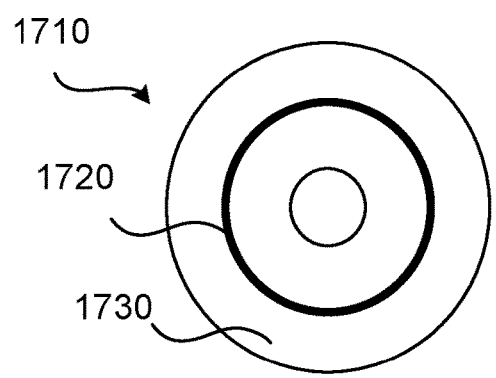
FIG. 17 shows one example of a computer program product comprising computer readable storage medium according to an embodiment.

FIG. 17 shows one example of a computer program product 1710 comprising computer readable storage medium 1730. On this computer readable storage medium 1730, a computer program 1720 can be stored, which computer program 1720 can cause the processing circuitry 210 and thereto operatively coupled entities and devices, such as the communications interface 220 and the storage medium 230, to execute methods according to embodiments described herein. The computer program 1720 and/or computer program product 1710 may thus provide means for performing any steps as herein disclosed.

In the example of FIG. 17, the computer program product 1710 is illustrated as an optical disc, such as a CD (compact disc) or a DVD (digital versatile disc) or a Blu-Ray disc. The computer program product 1710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1720 is here schematically shown as a track on the depicted optical disk, the computer program 1720 can be stored in any way which is suitable for the computer program product 1710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling total average transmission power of a radio base station, the method being performed by a control device, the method comprising:
   performing control of total average transmission power $\langle P_{tot} \rangle (t)$ of the radio base station according to a back-off power control loop,
   wherein, in the back-off power control loop, a setpoint value $\langle P_{tot} \rangle^{ref}$ of the total average transmission power is compared with a value of the total average transmission power $\langle P_{tot} \rangle (t)$,
   wherein the value of the total average transmission power $\langle P_{tot} \rangle (t)$ is computed over an averaging time T,
   wherein control parameters of the back-off power control loop are scaled proportionally to the inverse of the averaging time T, and
   wherein the control parameters pertain to a response time of the back-off power control loop.

2. The method according to claim 1, wherein the control parameters of the back-off power control loop are scaled proportionally to a nominal value $T_0$ of the averaging time T.

3. The method according to claim 2, wherein the back-off power control loop has a nominal derivative estimation pole location $\alpha_0$ for the nominal averaging time $T_0$, and wherein the control parameters are scaled by the nominal derivative estimation pole location $\alpha_0$ being scaled to a derivative estimator pole value $\alpha_{scaled}$ according to:

$$\alpha_{scaled} = \frac{T_0}{T} \alpha_0.$$

4. The method according to claim 2, wherein the nominal averaging time $T_0$ is 6 minutes.

5. The method according to claim 3, wherein the averaging time T defines a length of a sliding window within which all power values for determining the value of the total average transmission power $\langle P_{tot} \rangle$ (t) are sampled, wherein the power values are sampled according to a sampling period $T_S$, and wherein, in the back-off power control loop, the sampling period $T_S$ is scaled inversely proportional to the nominal value $T_0$.

6. The method according to claim 5, wherein the sampling period $T_S$ is scaled from a nominal sampling period value $T_{S,0}$ to a scaled value $T_{S,scaled}$.

7. The method according to claim 6, wherein $T_{S,scaled}$ is determined according to:

$$T_{S,scaled} = \frac{T}{T_0} T_{S,0}.$$

8. The method according to claim 5, wherein the sampling period $T_S$ is scaled such that the number of power values sampled within the averaging window is independent of the averaging time T.

9. The method according to claim 1, wherein each control parameter is scaled with respect to a nominal value of said each control parameter.

10. The method according to claim 1, wherein performing the control comprises filtering, by application of at least one filter, power values for determining a value of a dynamic threshold for limitation of next total average transmission power and wherein the filter is defined by at least some of the control parameters.

11. The method according to claim 1, wherein the back-off power control loop has a proportional gain parameter C and a differentiation time parameter $T_D$, and wherein one of the control parameters corresponds to the proportional gain parameter C and another of the control parameters corresponds the differentiation time parameter $T_D$.

12. The method according to claim 11, wherein the control parameters are scaled, with the proportional gain parameter C being scaled from a nominal value $C_0$ to a scaled value $C_{scaled}$, and the differentiation time parameter $T_D$ being scaled from a nominal value $T_{D,0}$ to a scaled value $T_{D,scaled}$.

13. The method according to claim 1, wherein the back-off power control loop is defined by a closed loop transfer function H(s), and wherein at least some of the control parameters correspond to poles $\alpha_1$ and $\alpha_2$ of the closed loop transfer function.

14. The method according to claim 13, wherein the control parameters are scaled by the poles $\alpha_1$ and $\alpha_2$ being scaled from nominal values $\alpha_{1,0}$ and $\alpha_{2,0}$ to scaled values $\alpha_{1,scaled}$ and $\alpha_{2,scaled}$ according to:

$$\alpha_{1,scaled} = \frac{T_0}{T} \alpha_{1,0},$$

$$\alpha_{1,scaled} = \frac{T_0}{T} \alpha_{2,0}.$$

15. The method according to claim 14, wherein the back-off power control loop has a proportional gain parameter C and a differentiation time parameter $T_D$, and wherein one of the control parameters corresponds to the proportional gain parameter C and another of the control parameters corresponds the differentiation time parameter $T_D$,
wherein the control parameters are scaled, with the proportional gain parameter C being scaled from a nominal value $C_0$ to a scaled value $C_{scaled}$, and the differentiation time parameter $T_D$ being scaled from a nominal value $T_{D,0}$ to a scaled value $T_{D,scaled}$,
wherein $P_{max,site}$ denotes maximum allowed transmission power of the radio base station, and
wherein:

$$C_{scaled} = \frac{\alpha_{1,scaled} \alpha_{2,scaled}}{P_{max,site}}.$$

16. The method according to claim 14, wherein the back-off power control loop has a proportional gain parameter C and a differentiation time parameter $T_D$, and wherein one of the control parameters corresponds to the proportional gain parameter C and another of the control parameters corresponds the differentiation time parameter $T_D$,
wherein the control parameters are scaled, with the proportional gain parameter C being scaled from a nominal value $C_0$ to a scaled value $C_{scaled}$, and the differentiation time parameter $T_D$ being scaled from a nominal value $T_{D,0}$ to a scaled value $T_{D,scaled}$,
wherein:

$$T_{D,scaled} = \frac{\alpha_{1,scaled} + \alpha_{2,scaled} - \frac{1}{T}}{\alpha_{1,scaled} \alpha_{2,scaled}}.$$

17. The method according to claim 1, wherein the averaging time T is between 0.5 minutes and 30 minutes.

18. The method according to claim 1, wherein an average output power of the radio base station is limited by a resource factor value $\gamma(t)$.

19. A control device for controlling total average transmission power of a radio base station, the control device comprising processing circuitry, the processing circuitry being configured to cause the control device to:
perform control of total average transmission power $\langle P_{tot} \rangle$ (t) of the radio base station according to a back-off power control loop,
wherein, in the back-off power control loop, a setpoint value $\langle P_{tot} \rangle^{ref}$ of the total average transmission power is compared with a value of the total average transmission power $\langle P_{tot} \rangle$ (t),
wherein the value of the total average transmission power $\langle P_{tot} \rangle$ (t) is computed over an averaging time T,
wherein control parameters of the back-off power control loop are scaled proportionally to the inverse of the averaging time T, and wherein the control parameters pertain to a response time of the back-off power control loop.

20. A computer-readable storage medium having stored thereon a computer program comprising instructions which, when executed by a computer, cause the computer to:

perform control of total average transmission power $\langle P_{tot} \rangle$ (t) of the radio base station according to a back-off power control loop, wherein, in the back-off power control loop, a setpoint value $\langle P_{tot} \rangle^{ref}$ of the total average transmission power is compared with a value of the total average transmission power $\langle P_{tot} \rangle$ (t), wherein the value of the total average transmission power $\langle P_{tot} \rangle$ (t) is computed over an averaging time T, wherein control parameters of the back-off power control loop are scaled proportionally to the inverse of the averaging time T, and wherein the control parameters pertain to a response time of the back-off power control loop.

* * * * *